VARIABLE ATTENUATION CIRCUIT

Filed July 15, 1966 2 Sheets-Sheet 1

(PRIOR ART)

INVENTOR
PAUL E. STUCKERT

BY Roy R. Schlemmer, Jr.
ATTORNEY

Feb. 3, 1970 P. E. STUCKERT 3,493,875

VARIABLE ATTENUATION CIRCUIT

Filed July 15, 1966 2 Sheets-Sheet 2

3,493,875

VARIABLE ATTENUATION CIRCUIT

Paul E. Stuckert, Katonah, N.Y., assignor to International Business Machines Corporation, Armonk, N.Y., a corporation of New York Filed July 15, 1966, Ser. No. 565,518
Int. Cl. H03k *17/78*
U.S. Cl. 328—151 5 Claims

ABSTRACT OF THE DISCLOSURE

A variable attenuation circuit, especially adapted for use with a signal sampling system said circuit comprising two capacitors, and two diodes forming a bridge circuit wherein said two diodes are series connected in front to back relationship, and said capacitors are connected together at one end and are connected to the free ends of each of said diodes at the other. Means for connecting an input signal between a common connection between said capacitors and ground and for taking the output between the common connection between the two diodes and ground. As an additional feature of said circuit, a resistor may be connected in parallel with each diode which resistors effect a change in the attenuation characteristic of said attenuation circuit.

The present invention relates to a variable attenuation circuit. More particularly it relates to such a gain expander for use with wide band signal sampling systems.

There are many areas in the present day electronics industry where it is both desirable and necessary to be able to view in detail the shape and magnitude of extremely high frequency electrical signals in the multimegacycle range. However the normal gain bandwidth limitations of present amplifiers prevent the direct viewing or analysis of such signals. For example, low level signals having rise times in the fractional-nanosecond range are not capable of direct display on generally available apparatus. Accordingly sampling systems have been employed to display such waveforms. Such systems examine a small portion of a waveform, remember the amplitude of the examined portion for as long as desired and present a display of the instantaneous amplitude as, for example, a dot on a CRT display. On a subsequent cycle of the incoming signal it samples the waveform again slightly later in time and presents a new portion of the display and by continuing such procedure ultimately shows the complete display in a segmented or reconstructed form. It is of course to be understood that such analysis is only practicable with recurrent signals. Obviously however, although such a sampling system only works in an essentially recurrent signal system it is obviously not necessary that the pulse shape or amplitude never change. However the ability of such a sampling system to follow very rapid changes of pulse shapes is a major problem with such systems.

While such sampling circuits have a wide variety of applications in the measuring, display and testing fields, a primary use is in that of the sampling oscilloscope wherein it is desired to display a reasonably accurate representation of a sequentially sampled pulse train on the face of a cathode ray tube. A common type of sampling system, especially as used with sampling oscilloscopes, is known as an error-sampled feedback system. Such a sampling system employs a memory in said sampling system which stores a voltage proportional to the last sampled point on the last sampled pulse. The system in effect only stores a new voltage in the memory when there is a change in the magnitude of the signal at the point sampled. Such a system is sometimes referred to generally as a feedback sampling system with a ratchet memory. Assuming that the output from the memory is to be applied to an oscilloscope, the memory is not reset, but the display is blanked during the time of transition from the display of one sample to the display of the next sample. Thus, the result is a series of dots on the display screen.

One of the principle problems with such sampling systems and especially with such a system utilized with sampling oscilloscopes is that of allowing the output to reach an accurate quiescent state as soon as possible after any significant change in the magnitude of the sampled point in an incoming recurrent pulse train. As stated previously, the reason that sampling systems must be used in certain situations is that conventional amplifiers are unable to follow the rate of change of the incoming waveform relative to the bandwidth or frequency response characteristic of the signal amplifiers. In addition, with conventional sampling systems the error signal or voltage due to noise and other factors causes the output to inaccurately represent the input.

The dot weighting of a sampling system is best defined by the following formula:

$$\text{D.W.}=\frac{1-|(E_{02}-e_0)|}{|E_{02}-E_{01}|}$$

where:

$e_0$=the output after the first sample taken in the transition from quiescent output voltage $E_{01}$ to quiescent output voltage $E_{02}$.

$E_{01}$=the quiescent output voltage from the memory as a result of a number of samples on the output waveform.

$E_{02}$=the same as $E_{01}$ except that it is the output voltage corresponding to a new input amplitude.

As the system dot weighting approaches unity the output signal approaches the desired magnitude but the system error increases. The error signal is due to a combination of sampling gate noises inherent in the amplifiers and input signal variations such as both time and amplitude jitter. As will be readily apparent, such noise or random error becomes an even greater problem as the sensitivity of the sampling system increases.

One partial solution to the problem of improving such sampling systems has been to utilize a "smoothing" control. The introduction of such smoothing reduces the overall system dot weighting. The dot weighting, K, may have a range from 0 to 1, but values of K of the order of 0.05 to 0.10 must be used if any significant "averaging" effect is to be obtained. However this technique has one serious disadvantage in that a very large number of samples must be taken before the output of the sampling circuit reaches its quiescent state.

What has now been discovered is that by utilizing a variable attenuation circuit in the sampling amplifier circuitry for a sampling system, the effect of a high overall dot weighting and loop gain may be maintained while at the same time considerably reducing the number of samples which must be taken and thus the time in which the output will reach its quiescent or steady state after a significant change in an input signal between successive sample points.

It is accordingly a primary object of the present invention to provide an improved pulse sampling system.

It is a further object to provide such a system having particular utility for use with sampling oscilloscopes and the like.

It is a still further object to provide such a system which has in effect a high over-all dot weighting while providing the improved accuracy inherent in a system with low dot weighting.

It is yet another object to provide such a system providing a nonlinear attenuation network.

It is another object of the invention to provide such a nonlinear attenuation network having a relatively high attenuation for small signal variations and a relatively low attenuation for large signals.

The foregoing and other objects, features and advantages of the invention will be apparent from the following more particular description of a preferred embodiment of the invention, as illustrated in the accompanying drawings.

Figure 1:
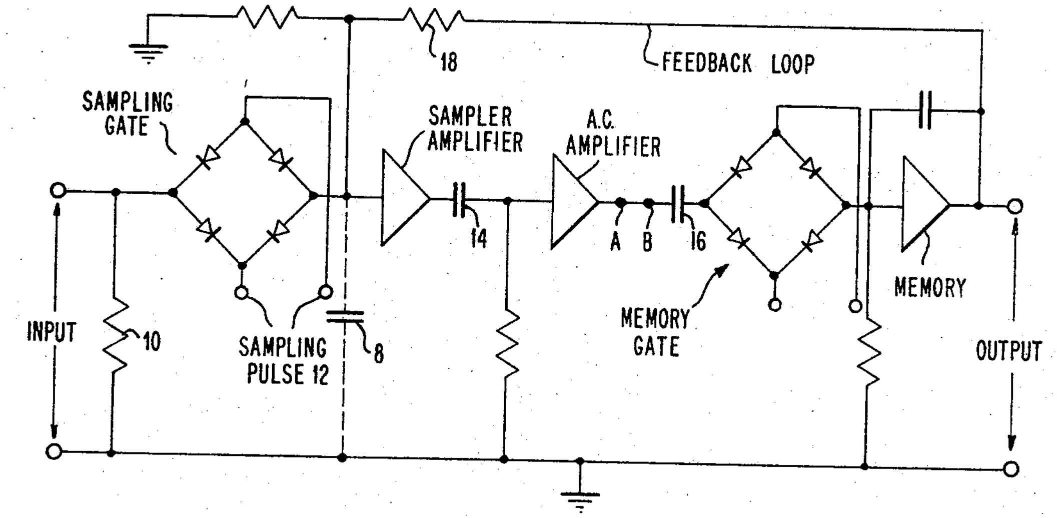
FIGURE 1 is a simplified block-schematic diagram of a prior art sampling system in which the present invention is adapted for use.

The objects of the present invention are accomplished in geneal by a variable attenuation circuit adapted for use with a sampling system. Said circuit comprises two capacitors and two diodes forming a bridge circuit, said two diodes being connected in series in front to back relationship, said capacitors being connected together at one end and being connected to the free ends of each of said diodes at the other. Means are provided for connecting an input signal between the common connection between said capacitors and ground and for taking the output from between this common connection between the two diodes and ground. Further means are provided for impressing equal and opposite current sources across the diagonal of said bridge circuit formed respectively by the connections between each of said capacitors and diodes. The bridge circuit is further characterized optionally by having two resistors of equal magnitude, one connected in parallel with each diode. This circuit may conveniently be connected in series with a more or less conventional sampling system and due to its unusual nonlinear characteristic will inherently vary the system dot weighting in order to place the sampling system at a quiescent state with a minimum number of sampling cycles.

As stated previously, the present invention has a wide application for most feedback sampling systems regardless of the ultimate use to which the sampled pulses are to be put. However, it has special utility in the display field and more particularly in combination with a sampling oscilloscope where a sample pulse is to be displayed on the face of a CRT tube and it is desired to have the display represent a sampled pulse train as accurately as possible and further to follow any changes in the shape of the individual pulses with a minimum delay. By utilizing the principles of the present invention the performance of sampling systems in general and sampling oscilloscopes in particular is considerably enhanced.

The invention will now be more particularly pointed out and described with reference to the accompanying drawings. The general operation of a feedback sampling system with ratchet memory, as generally utilized in the prior art and shown in FIGURE 1, will first be described to illustrate the over-all operating environment of the present invention.

For purposes of the following description it will be assumed that the over-all gain of the system is unity. That is, that the signal taken from the output terminals has the same magnitude as the signal applied to the input terminals. Thus in the drawings FIGURES 2 and 3 indicate the display as having approximately the same amplitude as the input signal.

In the system of FIGURE 1, the input signal is continuously applied to the input terminals. The resistor 10 is merely a suitable terminating impedance for the input transmission line. The Sampling bridge-type Gate is conveniently held reverse biased except during the short interrogate pulse period. This reverse biasing of the gate prohibits the signal from being passed to the Sampler Amplifier except during the desired sampling time. A suitable sampling pulse is applied to the terminals 12 which render the Sampling Gate conductive and allow a small portion of the sampled pulse to be passed to the Sampler Amplifier. Such a balanced bridge sampling gate operates with less noise and better linearity than other single diode type gates. However, it will be understood that any convenient electronic switch can be used for this purpose without effecting the specific operation of the present invention. When the sampling gate passes the signal, capacitor 8 starts to charge. It charges to a fraction of the difference between the signal and feedback voltages at the time of a sample. This is because there is insufficient time for the entire signal to be impressed across the capacitor due to circuit RC time constants. In the present type of feedback system the Amplifier and Memory circuits tend to make up the difference in signal amplitude and feedback a correcting voltage so that the value of the signal appearing across the capacitor 8 approaches the value of the signal during the immediately preceding sampling period. It is the extent, relative to the input signal, to which the signal across the capacitor 8 builds up due to the feedback which determines the dot weighting of the system. Thus if the signal fed back causes the voltage across capacitor 8 to just equal the input voltage, the system will have a dot weighting of 1.0 or unity. The capacitance 8 is due to a combination of stray and input capacitance at the input of the Sampling Amplifier. The output from the Sampler Amplifier is then passed through capacitor 14 which passes only the AC portion of the signal which is then fed to the AC Amplifier. The illustrated embodiment utilizing two amplifiers has certain advantages, however, a single AC or DC amplifier could equally well be used. The output of the AC Amplifier is conveniently fed through a second DC isolating capacitor 16 and then passed into the Memory Gate which is shown as a balanced diode gate very similar to the Sampling Gate and which operates in synchronism with said Sampling Gate to pass a difference signal, if one exists, during a particular sampling cycle into the Memory which will assume the new output level prescribed by the magnitude of said difference signal. The memory gate connects the memory circuit only long enough to respond to the amplified sample signal, then disconnects it. This prevents the memory from also responding to its own feedback signal. The feedback loop is connected from the output of the Memory through the resistor 18 to the input of the Sampler Amplifier. It is this Feedback Loop which builds up the signal voltage at the input of the Sampler Amplifier across capacitor 8 as explained previously. The output terminals may obviously be connected to any suitable utilization circuitry, however, in the case of a sampling oscilloscope, these output terminals would conventionally be fed to the input of the vertical amplifier for said oscilloscope.

Figure 2:
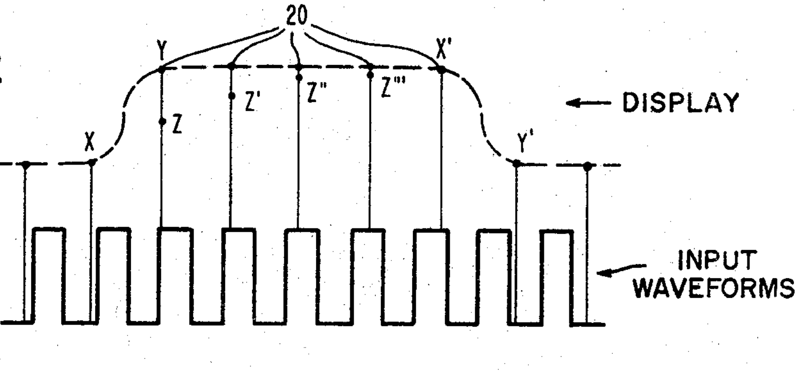
FIGURE 2 is a graphical representation of the manner in which a typical sampling system examines a recurrent waveform and produces an ultimate representation thereof.

FIGURE 2 illustrates graphically just what is meant by a sampling display system. It will be noted that the input waveform shown at the bottom of the figure is illustrated as a recurrent square wave. The dotted line in the upper portion of the figure represents the apparent envelope formed by the dots 20 which dots only appear on the face of the oscilloscope. It will be seen from this figure that each successive sample is taken at a slightly later time with respect to the time base of the input waveform. Thus, with the waveforms illustrated in FIGURE 2, nine samples or dots display a reconstructed version of the recurrent input signal. The display dots 20 shown along the dotted line represent the display with a dot weighting of unity. The dots displayed assuming a dot weighting of 0.5 would tend to approach the waveform indicated by the dots $z$, $z'$, $z''$, $z'''$ where with each new sample taken the new $E_{out}$ is half of the difference between the current $E_{in}$ and the last signal stored in the memory. It may readily be seen that with such systems, a very poor approximation of a sampled wave is displayed assuming the illustrated number of samples although less noise error would be present in the display. The prior art alleviates this problem by taking far more samples. Thus instead of ten sampling pulses per sweep on the scope prior art systems might utilize a hundred or more whereby the display will more closely approximate the sampled waveform. However, with such methods as will be apparent, far more samples must be taken before the signal displayed on the CRT closely approaches that of the input signal to the system.

Figure 3:
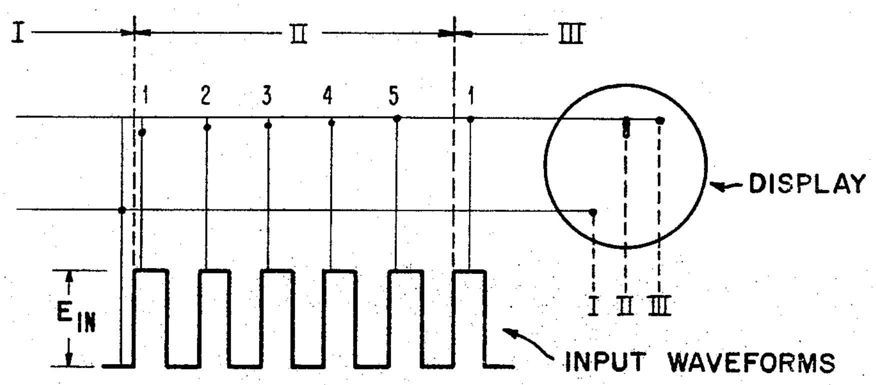
FIGURE 3 is a graphical representation of the manner in which the present sampling system samples an incoming signal set.

FIGURE 3 most clearly explains the operation of the improved sampling system as anticipated by the present invention. In FIGURE 3, is will be noted at the top of the figure, the Roman numerals I, II and III represent three different sampling periods wherein only the sampling period represented by the Roman numeral II is shown completely. According to this concept, it will be noticed that all of the samples of the incoming waveform are taken at approximately the same place on the sample during the particular sampling period and that the sampling position is stepped relative to both the sampling period I and sampling period III. The manner in which these samples are displayed is indicated in the circled area labeled "Display" in the figure wherein a series of dots is respectively numbered I, II and III. It will be noted that those dots denoted by the II represent the result of a series of samples taken where there was a considerable change in the input signal indicated on the drawing which causes a large difference signal to be fed to the Sampler Amplifier. It is significant here that the first dot taken during the sampling period II very closely approximates the magnitude of the input signal.

This is because a relatively large dot weighting is utilized, thus on the first sample the display approaches closely the incoming signal. However, if during the entire time of taking the sample during period II, the same large dot weighting were utilized the sampling or other noise introduced might adversely effect the accuracy of the display. Hence, at this point, the present system materially reduces the dot weighting for example, from .9 to .2 with the result that the output signal or the difference in vertical displacement of the display dots between sampling point 1 and 2 is very small. However, since the majority of the change in the signal and thus vertical displacement has been shown on the display at point 1, a fairly good approximation of the actual input signal is shown after even two such samples. The samples taken at points 3, 4 and 5 represent even smaller dot weighting, however, each time the dot weighting is reduced the chance for error in display is similarly proportionately reduced. Therefore, after say 5 to 10 cycles, the then current display dot is a very close approximation of the magnitude (assuming, as stated previously, an over-all system gain of unity) of the then sampled portion of the incoming wave. Passing on now to the sampling period III, since the difference signal between sampling point 5 and the first sampling point in sampling period III is negligible, this series of dots will appear as essentially a single dot on the display. Thus, according to the present invention, a sampling system is provided wherein when an initial large change or difference is detected between two successive samples taken by the system, the system first responds with a relatively large dot weighting approaching unity and subsequent thereto as the difference signal between successive sampling steps is less, the dot weighting is substantially reduced to eliminate inaccuracies due to the aforementioned noise signals and thus provides a better weighted running average with fewer samples taken. By utilizing the system of the present invention, it has been found that a given degree of accuracy may be obtained by taking between 5 and 10 samples for a given point on an incoming waveform as compared to 50 or more with a conventional system.

Figure 4:
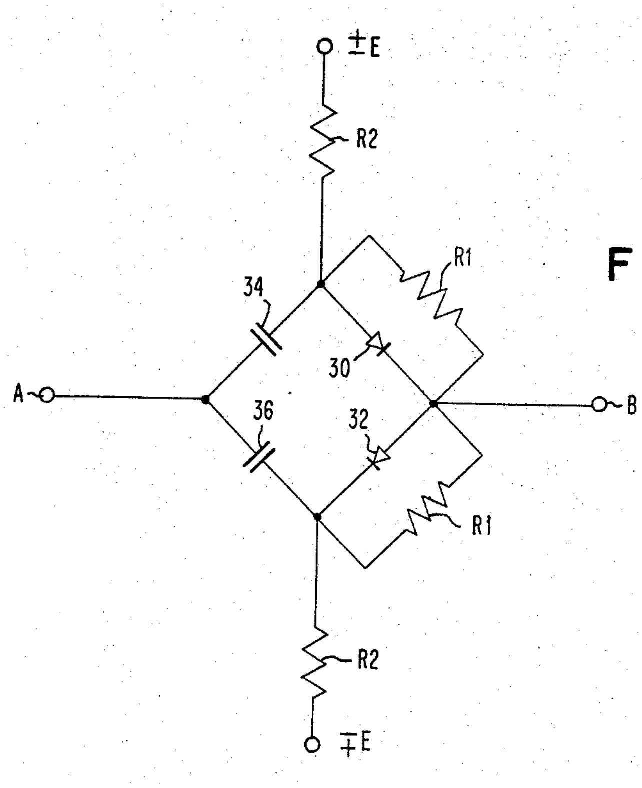
FIGURE 4 is a schematic diagram of the variable attenuation circuit of the present invention.

The circuitry utilized to obtain such a variable attenuation of the amplifier output in the sampling system is set forth in FIGURE 4 and as indicated by the letters A and B in this figure is inserted in a typical sampling amplifier circuit such as illustrated in FIGURE 1 between the similarly labeled points A and B. The circuit of FIGURE 4 introduces a nonlinear characteristic in this system which circuit has the input output transfer characteristic shown, for example, in FIGURE 5.

The dynamic gain expander circuit shown in FIGURE 4 may be directly connected as illustrated or might be suitably isolated with emitter follower transistor stages if desired. As is clearly evident, the circuit comprises a bridge circuit formed by the two diodes 30 and 32 connected in front-to-back relationship and the two capacitors 34 and 36. The input signal is applied between the two capacitors and ground. The biasing source ($\pm$E, $\mp$E) for the diodes is connected across the other diagonal of the bridge circuit. The output is taken off between the common connection between the two diodes and ground. The resistors R2 are primarily for the purpose of isolating the biasing voltage source or making it a constant current source as will be understood by those skilled in the art. The two resistors R1 shunting the two diodes 30 and 32 optionally change the characteristic of the network for small input signals as will be explained subsequently with respect to FIGURE 5.

Figure 5:
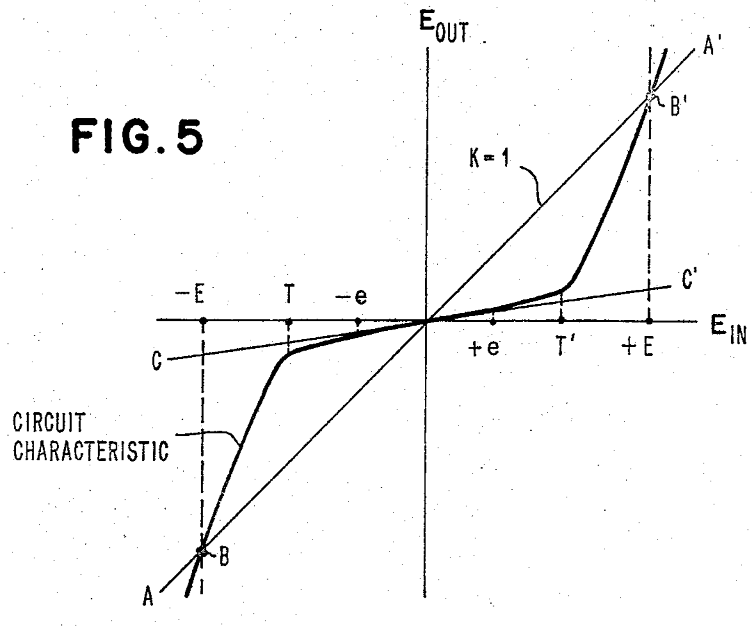
FIGURE 5 is a graph illustrating a typical characteristic curve for the dynamic gains expander shown in FIGURE 2.

Referring now specifically to FIGURE 5, the characteristic of the gain expander circuit of FIGURE 4 is illustrated by the heavy curved line passing through the points B, the origin and B'. It will be readily appreciated that with the connections indicated that the system dot weighting (K) is a function of the expander characteristic.

The characteristic curve shown in FIGURE 5 is formed basically by the resultant characteristic of the two front-to-back diodes 30 and 32. The capacitors 34 and 36 are primarily for the purpose of AC isolation and could be optionally replaced in some situations by two equal resistors. The line C–C' in the figure which is tangent to the characteristic curve in the area of the origin is an approximate representation of the system dot weighting for small amplitude signals ($\pm e$) as shown in the figure. This remains approximately constant until the threshold (T and T') for the diodes as shown in the figure are reached at which point the characteristics bend fairly sharply. For input signals between $\pm e$ and $\pm$E, the system dot weighting increases up to a value of unity at the point where the characteristic crosses the line A–A' at the points B and B'.

For a typical system, the circuit is designed so that the points B and B' where the circuit characteristic crosses the unity dot weighting line A–A' is at least as large as the maximum input or difference signal which is to be expected in this system. Thus, it will be readily appreciated when an initial input signal is applied to the sampling system including the dynamic gain expander of the invention, the initial difference signal will fall in a region where the dot weighting approaches unity and thus will provide a relatively large change in the output signal and when the next sampled signal is in turn fed to the input of the system the different signal will be much smaller (in the region of $\pm e$) resulting in a much smaller dot weighting thus allowing the system to approach the desired signal level without the interference of large quantities of noise and other error due to the factors set forth previously.

The slope of the C–C' may be changed by varying the resistors R1 such that as the resistance is increased the slope decreases and for smaller signals a lower dot weighting may be obtained.

By changing the value or the polarity of the bias voltages (±E) as shown in FIGURE 4 at the opposite diagonal of the bridge circuit from the signal input and output terminals, the thresholds or bends in the characteristic may be relocated along the horizontal axis. Thus, if the reverse biasing of the diodes is increased, a larger input signal will be required before a threshold is reached. Similarly, if the reverse bias is decreased, the threshold point will be lowered.

The present variable attenuation circuit has particular utility for use with the previously described sampling mode where a number of samples are taken at the same point on an input waveform before the next point is sampled. However, it should be clearly understood that it will also materially reduce the number of samples that have to be taken for a given accuracy in a purely conventional system wherein each sample is taken at a successive location along the time base of such input signal.

There has thus been shown and described an improved sampling system wherein the dot weighting is automatically changed in accordance with the magnitude of an input signal, which change materially reduces the number of samples and thus the time required for the sampling system to reach a state of equilibrium. Use of the present dynamic gain expander should consistently improve the performance of otherwise standard sampling oscilloscopes thus making it possible for them to more accurately follow a rapidly changing input signal since significantly fewer sampling pulses need to be taken to achieve a desired amount of accuracy.

Further, this improved sampling system is not limited to use with visual display apparatus. For example, the output of the sampling system could be fed to an analog to digital converter which will very accurately measure the output voltage and thus accurately determine the magnitude of the sampled point of the input waveform. With such accurate detection apparatus the accuracy of the sampling system becomes particularly important.

While the system has been shown and described with reference to a preferred embodiment thereof, it will be understood by those skilled in the art that various changes in form and details may be made therein without departing from the spirit and scope of the invention.

What is claimed is:

1. A variable attenuation circuit characterized by inherently varying the attenuation of the circuit so that for small magnitude input signals a low but significant output occurs, and for large magnitude input signals a significantly larger output occurs, and wherein said circuit has an input-output transfer characteristic as plotted with signal in *v:s* signal out having a positive and negative threshold and which is symmetrical about its origin and is tangent to a line passing through said origin, said line having a slope which is much less than the average slope of said characteristic beyond the thresholds of said curve said circuit comprising:

two diodes connected in front to back relationship and two non-inductive impedances connected together at one end and to the opposite ends of said diodes at the other to form a bridge circuit, two resistors, one of said resistors being connected in parallel with one of said diodes and the other of said resistors being connected in parallel with the other of said diodes, means for connecting an input signal between the point defined by the common junction of said two impedances and ground, means for taking the output from said bridge circuit between the point defined by the common junction of said two diodes and ground, bias means connected across the diagonal of said bridge circuit formed by the two junctions between each of said impedances and diodes, and two resistances of substantially equal magnitude in series with said bias means at opposite sides of said bridge circuit.

2. A variable attenuation circuit as set forth in claim 1 wherein said bias means comprises two equal and opposite polarity constant current sources connected to opposite terminals of said diagonal and wherein said two impedances are capacitors.

3. In a signal sampling system including sampling gate means for sequentially sampling selected portions of a recurrent incoming signal, amplification means for suitably amplifying each sampled signal, memory means for storing successive signals, gating means for selectively transferring the output of said amplification means to said memory means, feedback means connected between the output of said memory and the input of said amplification means the improvement which comprises:

a variable attenuation circuit associated with said amplification means characterized by inherently varying the attenuation of the circuit so that for small magnitude input signals a low but significant output occurs, and for large magnitude input signals a significantly larger output occurs, said circuit comprising:

two diodes connected in front to back relationship and two capacitors connected together at one end and to the opposite ends of said diodes at the other, means for connecting an input signal between the point defined by the common junction of said two capacitors and ground, means for taking the output from said bridge circuit between the point defined by the common junction of said two diodes and ground, bias means connected across the diagonal of said bridge circuit formed by the two junctions between each of said capacitors and diodes, and two resistances of substantially equal magnitude in series with said bias means at opposite sides of said bridge circuit.

4. A sampling system as set forth in claim 3 wherein said bias means comprises two equal and opposite substantially constant current sources connected to opposite terminals of said diagonal.

5. A sampling system as set forth in claim 4 including two resistors of substantially equal magnitude, one of said resistors being connected in parallel with one of said diodes and the other of said resistors being connected in parallel with the other of said diodes.

References Cited

UNITED STATES PATENTS

| | | | |
|---|---|---|---|
| 2,753,519 | 7/1956 | Fischman | 328—155 |
| 3,075,086 | 1/1963 | Mussard | 307—321 |
| 3,193,759 | 7/1965 | Bogdan et al. | 307—237 |
| 3,248,655 | 4/1966 | Kobbe et al. | 328—151 |
| 3,287,567 | 11/1966 | Gaon | 307—321 |
| 3,312,894 | 4/1967 | Blake et al. | 328—151 |
| 3,328,705 | 6/1967 | Eubanks | 328—151 |
| 3,412,263 | 11/1968 | Boyd | 307—229 |

DONALD D. FORRER, Primary Examiner

H. A. DIXON, Assistant Examiner

U.S. Cl. X.R.

307—235, 237, 259; 333—14